US00RE37435B1

(19) United States
(12) Reissued Patent
Yoshimura et al.

(10) Patent Number: US RE37,435 E
(45) Date of Reissued Patent: *Nov. 6, 2001

(54) SUPERVISION CONTROL SYSTEM

(75) Inventors: Shuji Yoshimura, Raleigh; Satoshi Kakuma, Kawasaki; Naoki Aihara, Kanagawa, all of (JP); Yasuhiro Aso, London (GB); Masami Murayama, Kanagawa (JP)

(73) Assignee: Fujitsu Limited, Kawasaki (JP)

( * ) Notice: This patent issued on a continued prosecution application filed under 37 CFR 1.53(d), and is subject to the twenty year patent term provisions of 35 U.S.C. 154(a)(2).

(21) Appl. No.: 08/810,977

(22) Filed: Feb. 27, 1997

Related U.S. Patent Documents

Reissue of:
(64) Patent No.: 5,394,396
Issued: Feb. 28, 1995
Appl. No.: 08/261,890
Filed: Jun. 17, 1994

U.S. Applications:

(63) Continuation of application No. 07/780,121, filed on Oct. 19, 1991, now abandoned.

(30) Foreign Application Priority Data

Oct. 19, 1990 (JP) ..... 2-279153

(51) Int. Cl.[7] ..... H04J 3/14
(52) U.S. Cl. ..... 370/236; 370/399
(58) Field of Search ..... 370/229, 230, 370/231, 232, 233, 234, 235, 238, 395, 389, 468, 431, 447, 449, 455, 461, 462, 477, 471, 444, 443, 442, 428, 411, 412–418; 340/825.5, 825.51, 825.52

(56) References Cited

U.S. PATENT DOCUMENTS 4,769,810 9/1988 Eckberg, Jr. et al. .
4,769,811 9/1988 Eckberg, Jr. et al. .

(List continued on next page.)

FOREIGN PATENT DOCUMENTS 0293314 11/1988 (EP) .
0310173 4/1989 (EP) .
0366635 5/1990 (EP) .
0381275 8/1990 (EP) .
0383660 8/1990 (EP) .
0384758 8/1990 (EP) .
0387958 9/1990 (EP) .
02-90834 3/1990 (JP) .

OTHER PUBLICATIONS

*The Institute of Electronics, Information and Communication Engineers*, K. Asatani, et al, vol. J72–B–I, No. 11, pp. 886–895, Nov. 1989.

*The Institute of Electronics, Information and Communication Engineers*, K. Sato, et al, vol. J72–B–I, No. 11, pp. 904–916, Nov. 1989.

(List continued on next page.)

*Primary Examiner*—Dang Ton
(74) *Attorney, Agent, or Firm*—Staas & Halsey LLP

(57) ABSTRACT

A supervision control system for an ATM cell switching system counts the number of cells transmitted from a subscriber in a predetermined duration unit, attaches a sign to the cells when the counted value exceeds a predetermined value, and discards the cells to which the sign is attached when a buffer does not have enough capacity during a cell multiplexation.

98 Claims, 8 Drawing Sheets

U.S. PATENT DOCUMENTS

| | | |
|---|---|---|
| 4,849,968 | 7/1989 | Turner . |
| 4,896,316 | 1/1990 | Lespagnol et al. . |
| 4,918,687 | 4/1990 | Bustini et al. . |
| 4,942,569 | 7/1990 | Maeno . |
| 4,956,839 | 9/1990 | Torii et al. . |
| 4,964,119 | 10/1990 | Endo et al. . |
| 4,970,720 | 11/1990 | Esaki . |
| 4,984,264 | 1/1991 | Katsube . |
| 4,993,024 | 2/1991 | Quinquis et al. . |
| 5,007,043 | 4/1991 | van den Dool et al. . |
| 5,007,048 | 4/1991 | Kowalk . |
| 5,014,260 | 5/1991 | Wicklund . |
| 5,029,164 | 7/1991 | Goldstein et al. . |
| 5,038,345 | 8/1991 | Roth . |
| 5,050,163 | 9/1991 | Van Bavel et al. . |
| 5,062,106 | 10/1991 | Yamazaki et al. . |
| 5,081,620 | 1/1992 | Girard et al. . |
| 5,084,867 | 1/1992 | Tachibana et al. . |
| 5,130,985 | 7/1992 | Kondo et al. . |
| 5,132,966 | 7/1992 | Hayano et al. . |
| 5,138,607 | 8/1992 | Thiebaut et al. . |
| 5,140,584 | 8/1992 | Suzuki . |
| 5,140,588 | 8/1992 | Danner . |
| 5,142,653 | 8/1992 | Schefts . |
| 5,166,894 | 11/1992 | Saito . |
| 5,179,557 | 1/1993 | Kudo . |
| 5,233,606 | 8/1993 | Pashan et al. . |
| 5,267,232 | 11/1993 | Katsube et al. . |
| 5,280,483 | 1/1994 | Kamoi et al. . |
| 5,315,591 | 5/1994 | Brent et al. . |
| 5,390,176 | 2/1995 | Schoute et al. . |
| 5,392,280 | 2/1995 | Zheng . |
| 5,448,567 | 9/1995 | Dighe et al. . |
| 5,504,744 | 4/1996 | Adams et al. . |
| 5,706,288 | 1/1998 | Radhakrishan et al. . |
| 5,784,358 | 7/1998 | Smith et al. . |
| 5,850,385 | 12/1998 | Esaki . |
| 5,867,494 | 2/1999 | Krishnaswamy et al. . |
| 5,956,340 | 9/1999 | Afek et al. . |

OTHER PUBLICATIONS

A. Gravey et al., Analysis of a Priority Queue with Delay and/or Loss Sensitive Customers, Oct. 9–11, 1990, The 7th International Teletraffic Congress Seminar, Morristown, NJ.

F. Bonomi et al., Priority on Cell Service and on Cell Loss in ATM Switching, Oct. 9–11, 1990, The 7th ITC Seminar, Morristown, NJ.

B. T. Doshi et al., Congestion Control for Bursty Data in High Speed Wide Area Packet Networks: In–Call Parameter Negotiations, Oct. 9–11, 1990, The 7th ITC Seminar, Morristown, NJ.

J. Hyman et al., Real–Time Scheduling of Switching Nodes Based on Asynchronous Time Sharing, Oct. 9–11, 1990, The 7th ITC Seminar, Morristown, NJ.

K. Sriram et al., Voice Packetization and Compression in Broadband ATM Networks, Oct. 9–11, The 7th ITC Seminar, Morristown, NJ.

D.M. Lucantoni et al, Selective Cell Discard Mechanisms for a B–ISDN Congrestion Control Architecture, Oct. 9–11, 1990, The 7th ITC Seminar, Morristown, NJ.

P. Boyer, A Congrestion Control for the ATM, Oct. 9–11, 1990, The 7th ITC Seminar, Morristown, NJ.

F. Vakil et al., Shutter: A Flow Control Scheme for ATM Networks, Oct. 9–11, 1990, ITC Seminar, Morristown, NJ.

Kos Tutufor, On Admission Control and Policing in an ATM Based Network, Oct. 9–11, 1990, The 7th ITC Seminar, Morristown, NJ.

B. A. Makrucki, A Study of Source Traffic Management and Buffer Allocation in ATM Networks, Oct. 9–11, 1990, The 7th ITC Seminar, Morristown, NJ.

E. P. Rathgeb, Policing Mechanisms for ATM Networks Modeling and Performance Comparison, Oct. 9–11, 1990, The 7th ITC Seminar, Morristown, NJ.

F. Borgonovo et al., Policing in ATM Networks: An Alternative Approach, Oct. 9–11, 1990, The 7th ITC Seminar, Morristown, NJ.

N. Yin et al., Implication of Dropping Packets from the Front of a Queue, Oct. 9–11, 1990, The 7th ITC Seminar, Morristown, NJ.

D. W. Petr et al., Optimal Threshold–Based Discarding for Queue Overload Control, Oct. 9–11, 1990, The 7th ITC Seminar, Morristown, NJ.

N. M. Mitrou et al., Cell–Level Statistical Multiplexing in ATM Networks: Analysis, Dimensioning and Call–Acceptance Control w.r.t. QOS Criteria, Oct. 9–11, 1990, The 7th ITC Seminar, Morristown, NJ.

B. T. Doshi, A B–ISDN/ATM Network Congestion Control Architecture, and its Performance with Complementary End–Terminal Flow and Error Controls, Oct. 9–11, 1990, The 7th International Teletraffic Congress Seminar, Morristown, NJ.

Flow Control in Computer Networks, Experiments In Congestion Control Techniques, J.C. Majithia, Ph.D., et al 1979, pp. 211–234.

IEEE Communications Magazine, New Directions In Communications (or Which Way to the Information Age?), Jonathan S. Turner, Oct., 1986, vol. 24, No. 10, pp. 8–15.

IEEE Transactions On Comunications, Flow Control: A Comparative Survey, Mario Gerla et al, vol. Com. 28, No. 4, Apr. 1980, pp. 553–574.

IEEE Network Magazine, Toward A Broadband Congestion Control Strategy, C. Anthony Cooper et al, May 1990, pp. 18–23.

International Switching Symposium 1987, Proceedings: Synchronization Aspects of ATD–IBC Networks, F. van den Dool, Mar. 15–20, 1987, vol. 4 of 4, pp. B12.1.1–B12.1.5.

International Conference on Communications, Open Issues Regarding the Universal Application of ATM for Multiplexing and switching in the B–ISDN, M. Decina, Jun. 23–26, 1991, vol. 3 of 3, pp. 39.4.1–39.4.7.

Proceedings of the 11th Int'l Teletraffic Congress, Approximations for Bursty (and Smoothed) Arrival Queuing Delays Based on Generalized Peakedness, A.E. Eckberg, Jr., Kyoto, Japan (ITC–11), Sep. 4–11, 1985, pp. 331–335.

XIII International Switching Symposium, An ATM Switching System Based on a Distributed Control Architecture, Takeo Koinuma, et al, Stockholm, Sweden, May 27–Jun. 1, 1990, vol. 5, pp. 21–26.

IXV Int'l Switching Symposium, The Spacing Policer, An Algorithm for Efficient Peak Bit Rate Control in ATM Networks, Eugene Wallmeier et al, Yokohama, Japan, Oct. 25–30, 1992, vol. 2, pp. 22–26.

IEEE INFOCOM '90, Comparative Performance Study of Space Priority Mechanisms for ATM Networks, Hans Kroner, Jun. 3–7, 1990, pp. 1136–1143.

Int'l Journal of Digital and Analog Communication Systems, An Approach to Controlling Congestion in ATM Networks, A.E. Eckberg, Jr., et al., Apr.–Jun. 1990, vol. 3, No. 2, pp. 199–209.

ITC Specialist Seminar, Bandwidth Management: A Congestion Control Strategy for Broadband Packet Networks—Characterizing the Throughput–Burstiness Filter, A.E. Eckberg, et al, Adelaide, 1989, Paper No. 4.4, pp. 1–8.

T1 Contribution T1S1.5/90–96, Working Group T1S1.5 Contribution, B–ISDN/ATM Congestion Control Capabilities, A.E. Eckberg, Apr. 16–20, 1990, pp. 1–6.

B–ISDN Technical Workshop, Underlying Issues and Objectives, and an Overall Control Framework, For ATM Resource and Traffic Management, A.E. Eckberg, Phoenix, Arizona, Mar. 19–21, 1991.

Computer Communications Review, Virtual Clock: A New Traffic Control Algorithm for Packet Switching Netowrks, L. Zhang, vol. 20, No. 4, SIGCOMM '90 Symposium, pp. 19–29, Sep. 24–27, 1990.

IEEE Globecom '91, Tagging Versus Strict Rate Enforcement in ATM Networks, A. Gravey et al, Phoenix, Arizona, vol. 1, Dec. 2–5, 1991, pp, 9.5.1–9.5.5.

IEEE Journal on Selected Areas in Communications, Voice Packetization and Compression in Broadband ATM Networks, K. Sriram et al, vol. 9, No. 3, Apr., 1991, pp. 294–304.

IEEE Pacific RIM Conference on Communications, Computers and Signal Processing, Priority Queuing Strategies for Traffic Control at an ATM Integrated Broadband Switching System, Arthur Y–M, Lin et al, May 9–10, 1991, pp. 429–432.

1990 Int'l Zurich Seminar on Digital Communications, The Policing Function in an ATM Network, Denissen, F. et al, Mar. 5–8, 1990, pp. 131–144.

The Int'l Symposium on Subscriber Loops and Services (ISSLS '88), The "Policing Function" to Control User Access in ATM Networks —Definition and Implementation—, W. Kowalk, et al, pp. 12.2.1–12.2.6.

Int'l Journal of Digital and Analog Communication Systems, a Reasonable Solution to the Broadband Congestion Control Problem, C.A. Cooper et al, vol. 3, Apr.–Jun., 1990, pp. 103–115.

Int'l Journal of Digital and Analog Communication Systems, ATM Traffic Control for Guaranteed Performance, R. Kositpaiboon et al, vol. 3, Apr.–Jun., 1990, pp. 117–125.

Int'l Journal of Digital and Analog Communication Systems, A Congestion Measure for Call Admission and Traffic Engineering for Multi–Layer Multi–Rate Traffic, J.Y. Hui, vol. 3, Apr.–Jun., 1990, pp. 127–135.

Int'l Journal of Digital and Analog Communication Systems, Considerations in ATM Switching System Traffic Control, K. Murakami et al, Apr.–Jun., 1990, vol. 3, pp. 137–142.

Int'l Journal of Digital and Analog Communication Systems, A Connection Acceptance Algorithm for ATM Networks Based on Mean and Peak Bit Rates, E. Wallmeier, Apr.–Jun., 1990, vol. 3, pp. 143–153.

Int'l Journal of Digital and Analog Communication Systems, Admission Control over Mixed Traffic in ATM Networks, A. Lombardo et al, Apr.–Jun., 1990, vol. 3, pp. 155–159.

Int'l Journal of Digital and Analog Communication Systems, Dynamic Capacity Management in the BISDN, J. Burgin, vol. 3, Apr.–Jun., 1990, pp. 161–165.

Int'l Journal of Digital and Analog Communication Systems, The 'Leaky Bucket' Policing Method in the ATM (Asynchronous Transfer Mode) Network, G. Niestegge, Apr.–Jun., 1990, vol. 3, pp. 187–197.

Int'l Journal of Digital and Analog Communication Systems, Traffic Characteristics and a Congestion Control Scheme for an ATM Network, M. Hirano et al, vol. 3, Apr.–Jun., 1990, pp. 211–217.

Int'l Journal of Digital and Analog Communication Systems, Priority Cell Discarding for Overload Control in BISDN/ATM Networks: An Analysis Framework, D.W. Petr et al, vol. 3, Apr.–Jun., 1990, pp. 219–227.

Int'l Journal of Digital and Analog Communication Systems, An Architecture for Integrated Networks that Guarantees Quality of Service, A.A. Lazar et al, vol. 3, Apr.–Jun., 1990, pp. 229–238.

Proceedings of the 13th International Teletraffic Congress (ITC), Mixing Time and Loss Priorities in a Single Server Queue, A. Gravey et al, Jun. 1991, pp. 147–152.

IEEE Journal on Selected Areas in Communications, vol. 9, No. 3, Priority Management in ATM Switching Nodes, H. Kroner et al, Apr. 1991, pp. 418–427.

SUPERVISION CONTROL SYSTEM

Matter enclosed in heavy brackets [ ] appears in the original patent but forms no part of this reissue specification; matter printed in italics indicates the additions made by reissue.

This application is a continuation of application Ser. No. 07/780,121, filed Oct. 19, 1991, now abandoned.

BACKGROUND OF THE INVENTION

This invention pertains to a supervision control system for supervising the inflow of cells to an ATM switching system.

The ATM switching system switches cells having fifty-four (54) bytes split from various data, such as voice data, image data and other numerical data, and transmits in a multiplexed form the various data at different transmission speed. Of the fifty-four (54) bytes in a cell, forty-eight (48) bytes form an information field and six (6) bytes form a header part. Of the four (4) bytes, i.e. thirty-two (32) bits, in the header part excluding two (2) bytes forming a tag, twenty-eight (28) bits indicate a VPI/VCI (virtual path identifier/virtual channel identifier), two (2) bits indicate a PT (payload type), one (1) indicates a CLP (cell loss priority) and one (1) bit is for a RES (reserve).

A buffer in a multiplexer for these cells can experience an overflow when an unexpected number of cells flow in. Since overflowing cells are discarded, the communications quality is deteriorated. Although such a problem can be avoided by using a buffer having a larger capacity, a larger delay results, which is critical in transmitting voice data, image data, and so forth.

Therefore, a buffer is required in which the occurrence of an overflow and its effect are minimized.

DESCRIPTION OF THE RELATED ART

FIG. 1 is a block diagram of an ATM switching system.

As shown in FIG. 1, a plurality of terminals (TE) 10 are connected through respective terminal adapters (TA) 9 to one of plural network terminators (NT) 8 in an ATM switching system.

The network terminators (NT) 8 are connected through respective interoffice trunks 6 to one (1) of plural broadband remote switching units (BRSU) 7.

The broadband remote switching units (BRSU) 7 are connected to one (1) of a plurality of central offices (CO) 5.

The interoffice trunks 6 interconnect the central offices (CO) 5. The interoffice trunks 6 and subscriber lines are high speed transmission paths, such as an optical transmission path e.g. comprising a SONET (Synchronous Optical Network), having bands of one hundred fifty-five mega-herts (155 MHz), six hundred twenty-two mega-herts (622 MHz) or higher.

FIG. 2 shows a cell configuration.

As described earlier, voice data, image data, numerical data, etc. from the terminals (TE) 10 are split into cells having fifty-four (54) bytes. Because one (1) word is defined to comprise two (2) bytes, a cell has twenty-seven (27) words. As shown in FIG. 2, of the fifty-four (54) bytes in a cell, forty-eight (48) bytes form an information field and six (6) bytes form a header part. Of the six (6) bytes, i.e. forty-eight (48) bits, in the header part, two (2) bytes, i.e. sixteen (16) bits, form a tag, twenty-eight (28) bits indicate a VPI/VCI (virtual path identifier/virtual channel identifier), two (2) bits indicate a PT (payload type), one (1) bit indicates a CLP (cell loss priority) and one (1) bit is for a RES (reserve).

The network terminators (NT) 8 send the cells to the broadband remote switching unit (BRSU) 7.

The terminal adapters (TA) 9 receive cells from corresponding terminals (TE) 10 through the network terminators (NT) 8 and send the decelled voice data, image data, numerical data, etc. to the terminals (TE) 10.

FIG. 3 is a block diagram of one (1) of the broadband remote switching units (BRSU) 7.

A multiplexer/demultiplexer (MDX) 12 multiplexes cells asynchronously inputted from subscribers through a buffer and transmitted over a plurality of subscriber line trunks 11, which are connected to respective subscriber lines. A concentrator switch (CSW) 13 switches the multiplexed cells. A multiplexer/demultiplexer (MDX) 14 demultiplexes the switched cells over to an appropriate one (for the predetermined central office) of a plurality of interoffice trunks 15, which form interoffice cell transmission paths.

The multiplexer/demultiplexer (MDX) 14 multiplexes cells asynchronously inputted from correspondent subscribers through a buffer and transmitted over the interoffice trunks 15. The concentrator switch (CSW) 13 switches the multiplexed cells. The multiplexer/demultiplexer (MDX) 12 demultiplexes the switched cells over to an appropriate one (for the predetermined subscriber) of a plurality of subscriber line trunks 11.

A local processor interface (LPIF) 16 connects a local processor (LPR) 17 with the concentrator switch (CSW) 13 and multiplexers/demultiplexers (MDXs) 12 and 14.

When a larger number of cells flow into the multiplexer/demultiplexer (MDX) 12, its buffer causes some cells to overflow. Therefore, a virtual path is set at a call-up by having a subscriber declare his cell transmission band and by judging whether or not the cells can be multiplexed in the declared band.

In this case, if this subscriber sends cells over the declared band, cells from other subscribers who share the same buffer with this subscriber are also discarded.

That is, if any subscriber sends cells over the declared band, a large ill-effect occurs such that cells from other subscribers are also discarded.

SUMMARY OF THE INVENTION

This invention pertains to a supervision control system for supervising the inflow of cells to an ATM switching system.

It aims at avoiding a congestion state caused by a cell inflow over a band declared by a subscriber.

It configures a supervision control apparatus for an ATM (Asynchronous Transmission Mode) cell switching system comprising a supervisor and a multiplexer. The supervisor further comprises a cell counter and a judge. The cell counter counts cells transmitted from a subscriber in a predetermined duration unit. The judge attaches a sign to the cells when the value counted by the cell counter exceeds a predetermined value. The multiplexer discards the cells to which the sign is attached when a buffer does not have enough capacity during a cell multiplexation.

DESCRIPTION OF THE PREFERRED EMBODIMENTS

A supervision control system of this invention prioritizes discarding of cells overflowing from a buffer by attaching a high cell-loss-priority sign to cells flowing in over a band declared by a subscriber, thereby minimizing ill-effects to other subscribers.

Figure 4:
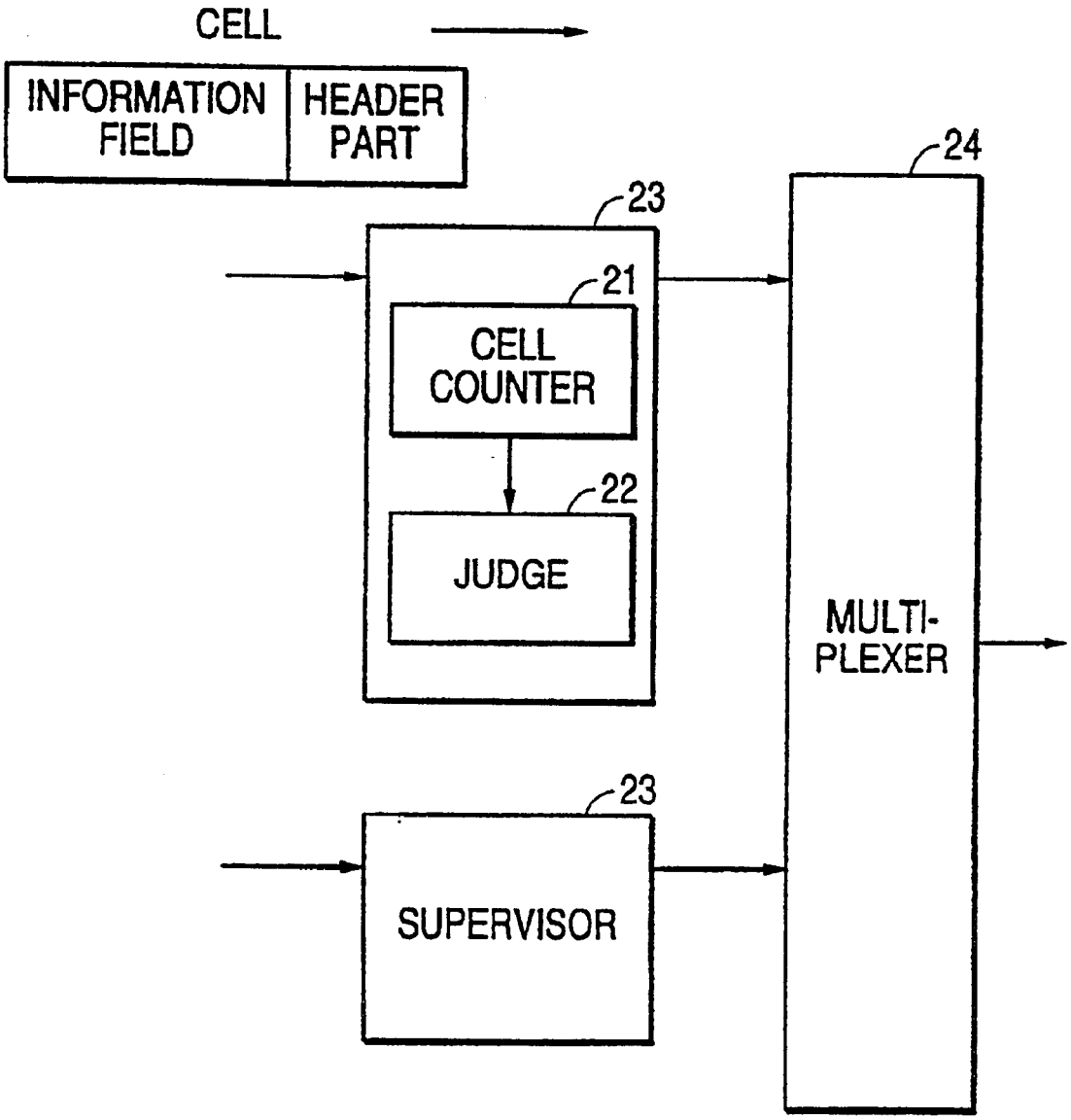
FIG. 4 is a block diagram of this invention.

FIG. 4 is a block diagram of this invention.

The supervision control apparatus for an ATM (Asynchronous Transmission Mode) cell switching system comprises a supervisor 23 and a multiplexer 24. A supervisor 23 further comprises a cell counter 21 and a judge 22. The cell counter 21 counts cells transmitted from a subscriber in a predetermined duration unit. The judge 22 attaches a sign to the cells when the value counted by the cell counter 21 exceeds a predetermined value. The multiplexer 24 discards the cells to which the sign is attached when a buffer does not have enough capacity during a cell multiplexation.

That is, the cell counter 21 in the supervisor 23 counts cells flowing in from a subscriber in a predetermined duration unit. The judge 22 in the supervisor 23 judges whether or not the cells are flowing in over the band declared by the subscriber and attaches a sign to a predetermined bit in the excess cells flowing in over the declared band. The multiplexer 24 multiplexes the cells having the sign for their transmission when its buffer has the capacity to handle them. However, the multiplexer 24 discards them with high priority, when neither the buffer in the multiplexer 24 itself nor the buffer in a concentrator switch, or in a demultiplexer, connected to the multiplexer 24 has a capacity to handle the cells, thereby ensuring the multiplexation and transmission of cells having no such sign inputted from other subscribers.

Alternatively, the judge 22 in the supervisor 23 can set a first judging threshold and a second judging threshold. The first judging threshold corresponds to a band declared by a subscriber. The second judging threshold is set higher than the first judging threshold. The judge 22 attaches a sign to the inflowing cells from a subscriber in excess of the first judging threshold, and discards the inflowing cells from the subscriber in excess of the second judging threshold.

That is, the judge 22 sets the first and second judging thresholds in correspondence with a band declared by a subscriber. The judge 22 attaches a sign to the excess inflowing cells over the first judging threshold by appropriately marking the CLP (cell loss priority) bit or the RES (reserve) bit of the cell, thereby prioritizing the discarding of such cells, when neither the buffer in the multiplexer 24 itself nor the buffer in a concentrator switch, or in a demultiplexer, connected to the multiplexer 24 has a capacity to handle the cells. The judge 22 always discards the inflowing cells in excess of the second judging threshold, because they are likely to cause an overflow in the buffer.

Embodiments of this invention are explained in further detail by referring to some of the attached drawings.

First Embodiment

Figure 1:
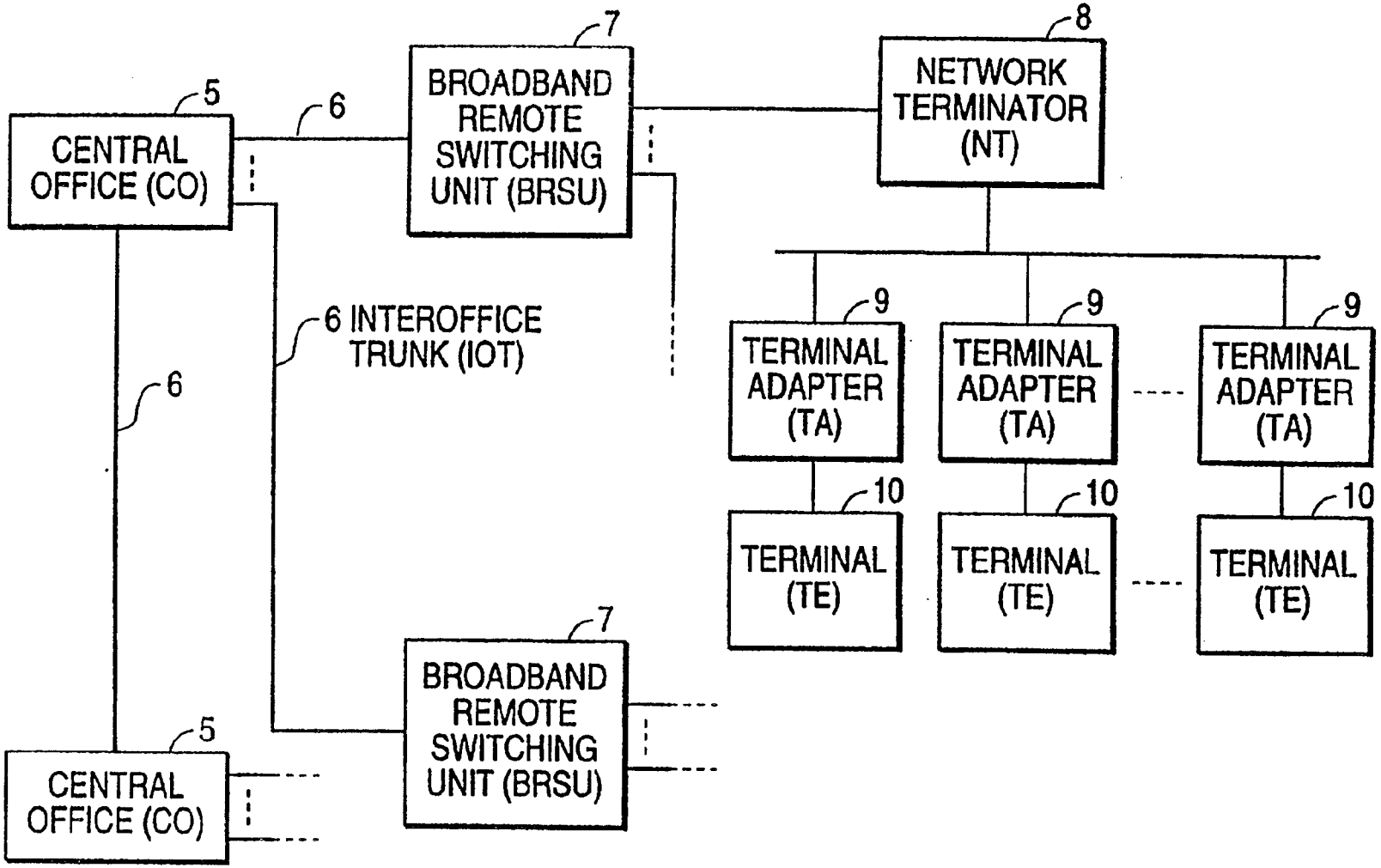
FIG. 1 is a block diagram of an ATM switching system.
Figure 2:
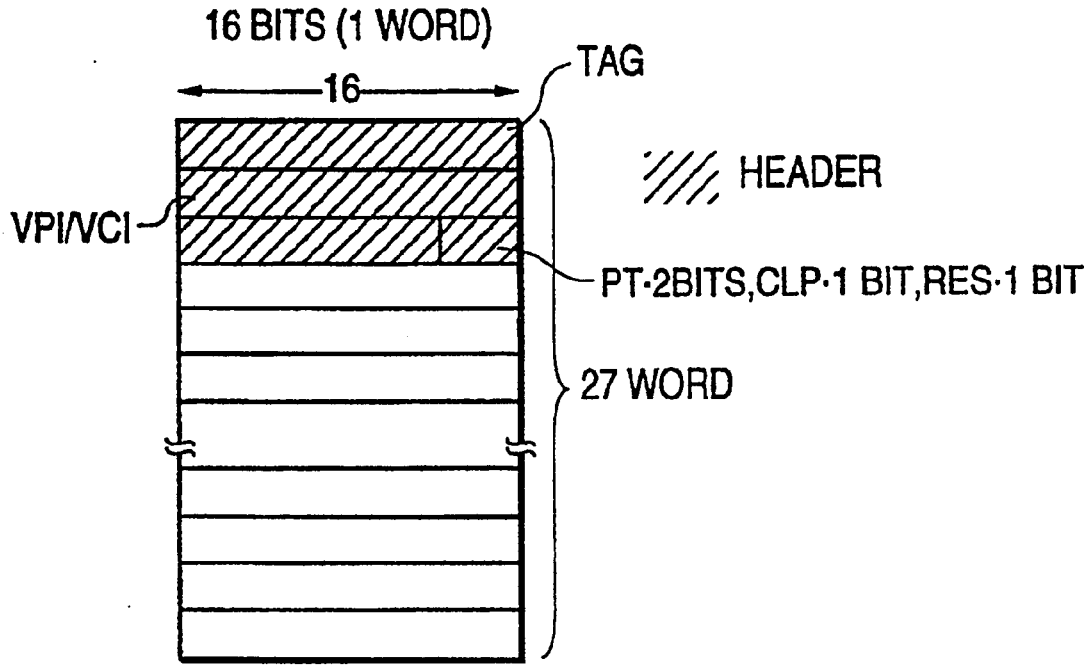
FIG. 2 shows a cell configuration.
Figure 5B:
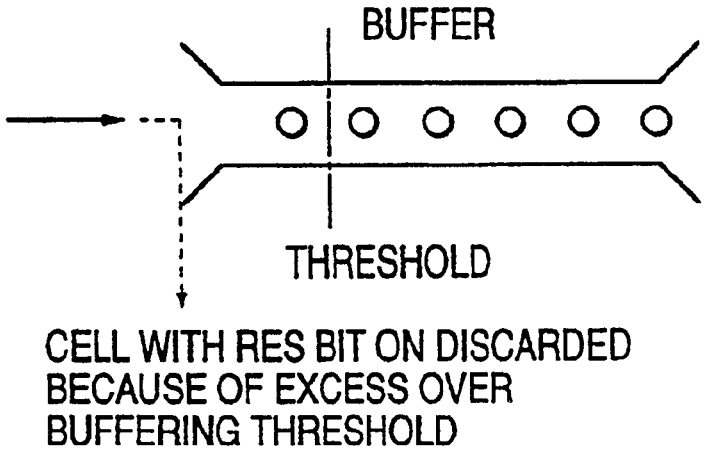
FIG. 5B illustrates an example of cell discarding.
Figure 3:
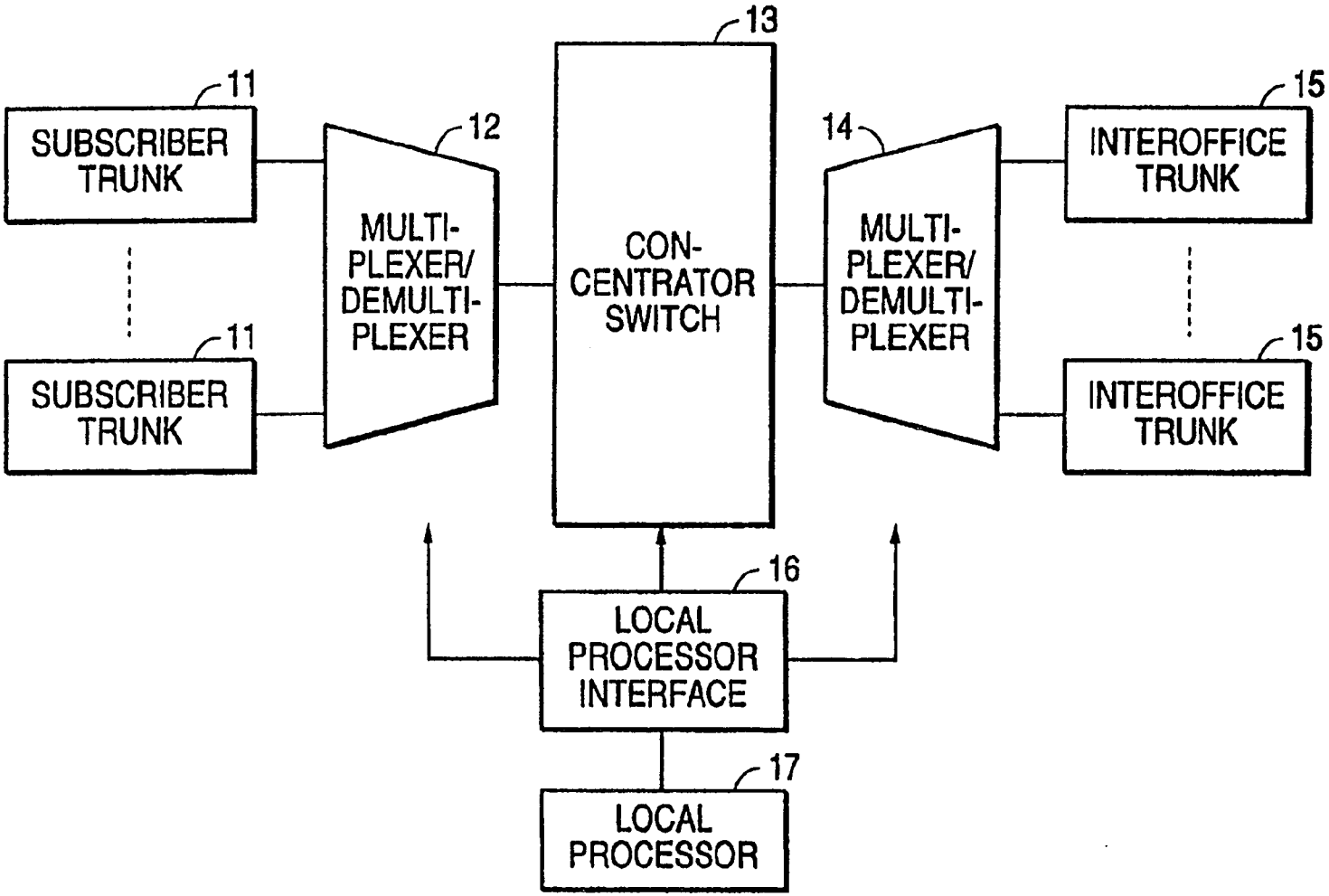
FIG. 3 is a block diagram of one (1) of the broadband remote switching units (BRSU) 7.
Figure 5A:
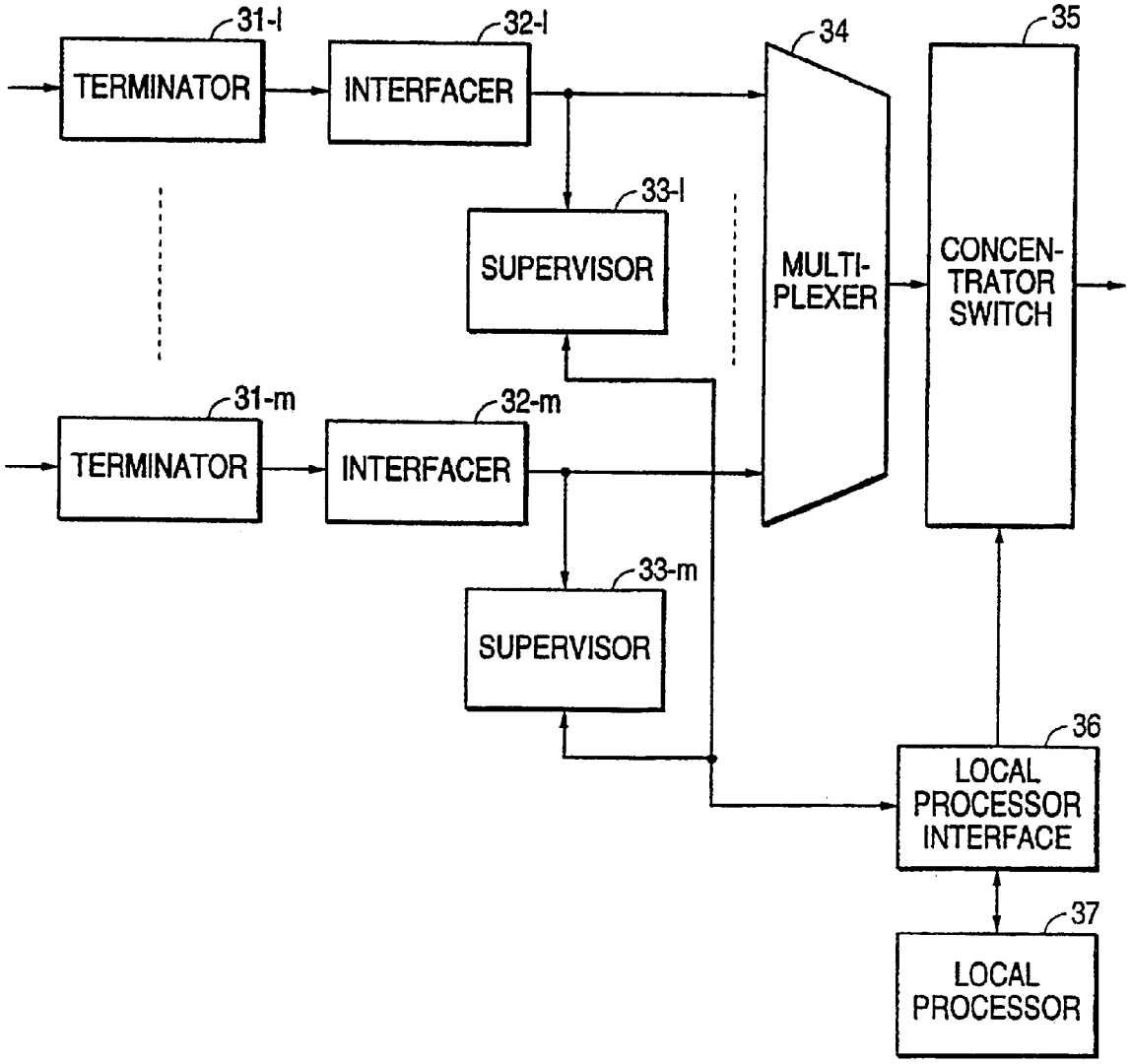
FIG. 5A is a block diagram of parts pertinent to a first embodiment of this invention.

FIG. 5A is a block diagram of parts pertinent to a first embodiment of this invention.

Subscriber line terminators 31-1 through 31-m each paired with the corresponding one of interfacers 32-1 through 32-m are equivalent to subscriber line trunks connecting subscribers to the ATM cell switching system. A multiplexer 34 receives cells from subscribers by way of the subscriber line terminators 31-1 through 31-m and the interfacers 32-1 through 32-m. Supervisors 33-1 through 33-m respectively supervise cell inflows to the multiplexer 34 via the subscriber line terminators 31-1 through 31-m and the interfacers 32-1 through 32-m.

When a subscriber calls up, he declares the band to be occupied. A processor 37 reads from a cell its VCI (virtual channel identifier) for specifying the switchers and the subscriber and its VPI (virtual path identifier) for specifying the paths among the switchers, and notifies the supervisors 33-1 through 33-m of the VCI/VPI and the maximum number of cells, set in correspondence with the subscriber declared band, passing through in a predetermined duration unit.

The supervisors 31-1 through 33-m count the number of cells having particular VCIs/VPIs in the predetermined duration units, and attach a sign to the cells in excess of the maximum number of cells, set in correspondence with the subscriber declared band, passing through in a predetermined duration unit, for example, by marking the CLP (cell loss priority) bit in those cells.

FIG. 5B illustrates an example of cell discarding.

Alternatively, the supervisors 33-1 through 33-m can attach a sign to the cells in excess of the maximum number of cells, set in correspondence with the subscriber declared band, passing through in a predetermined duration unit, by marking the RES (reserve) bit in those cells, as shown in FIG. 5B.

The multiplexer 34 has a buffer. It multiplexes cells from subscribers and supplies the multiplexed cells to a concentrator switch 35. However, it multiplexes cells having the sign marked in their CLP bit or in their RES bit only when the buffer has enough capacity, and discards them with high priority when the buffer does not have enough capacity. This ensures the multiplexation of cells from subscribers transmitted within the declared bands.

Also, even when the buffer in the multiplexer 34 has enough capacity to handle the cells, the buffer at an input terminal or at an output terminal of a device connected in a later stage, such as the concentrator switch 35 and a demultiplexer on the receiving side, discards the cells, if it does not have enough capacity.

Also, the supervisors 33-1 through 33-m can attach a sign to the cells in excess of a first judging threshold equivalent to the maximum number of cells, set in correspondence with the subscriber declared band, passing through in a predetermined duration unit, by marking either the CLP bit or the RES bit in those cells. The multiplexer 34 prioritizes the discarding of those cells having the sign, when its buffer lacks enough capacity. Other devices connected in later stages discard cells similarly, when their respective buffers lack enough capacity. When the number of cells passing through in a predetermined duration unit further increases and reaches a second judging threshold, the multiplexer 34 can be made to perform a control such that the excess cells over the second judging threshold are discarded regardless of the available capacity of the buffer in the multiplexer 34. The local processor interface 36 notifies the local processor 37 of the results of processing by the supervisors 33-1 through 33-m.

Second Embodiment

Figure 6:
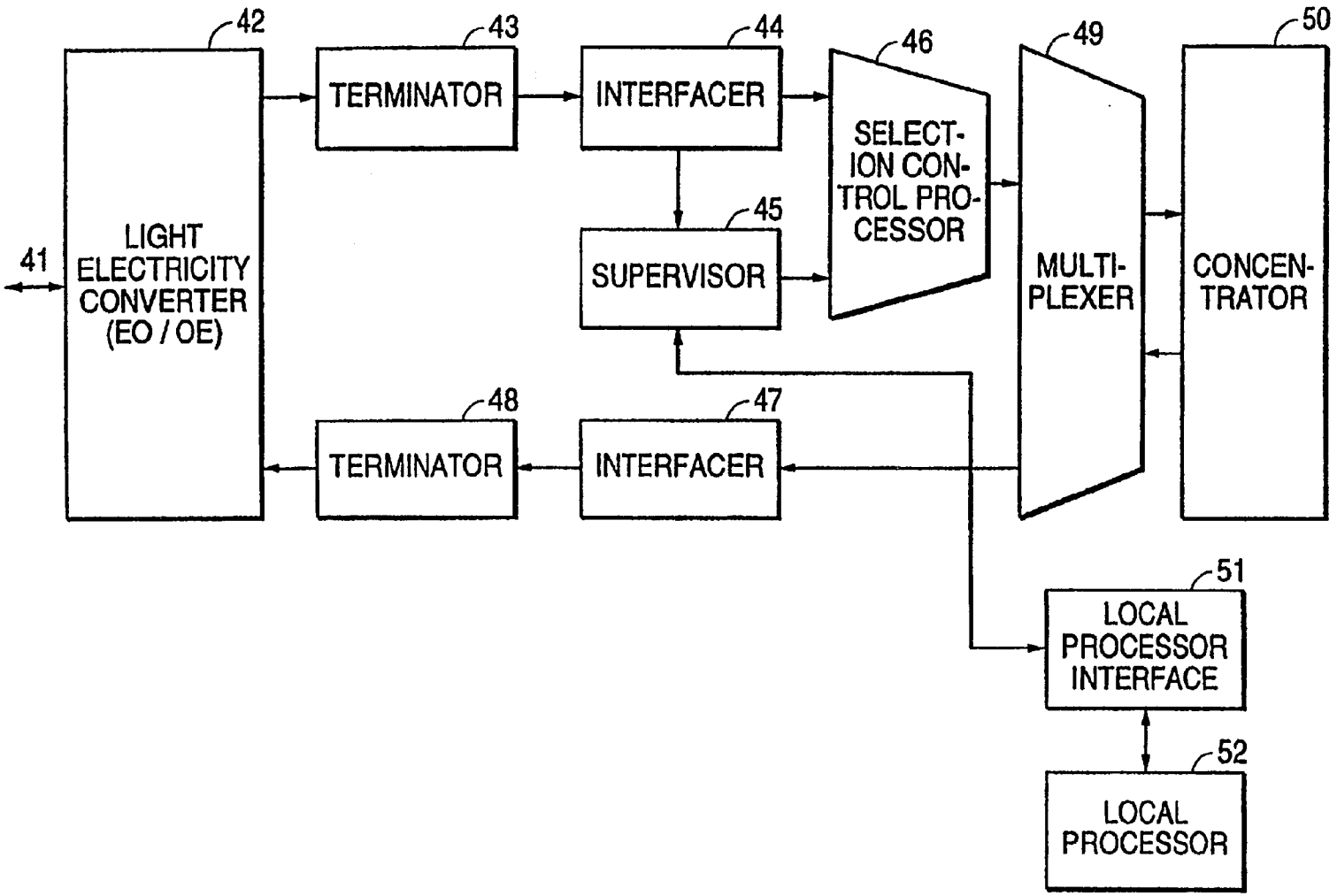
FIG. 6 is a block diagram of a subscriber line trunk pertinent to a second embodiment of this invention.

FIG. 6 is a block diagram of a subscriber line trunk pertinent to a second embodiment of this invention.

A subscriber line 41 such as a SONET based optical transmission path transmits cells in light signals. A light-electricity (electro-optic/optoelectric) converter (EO/OE) 42 converts the cells in light signals to cells in electric signals and supplies the converted cells through a terminator 43 and an interfacer 44 to a selection control processor 46. A local processor 52 notifies a supervisor 45 through a local processor interface 51 of a VCI/VPI and first and second judging thresholds set correspondingly to a subscriber declared band. An alternative arrangement can be made such that the processor notifies the supervisor 45 of a subscriber declared band and the supervisor 45 sets first and second judging thresholds accordingly.

The supervisor 45 counts the number of cells having a particular VCI/VPI passing through the interfacer 44 in a predetermined duration unit for a comparison with the first and second judging thresholds. The supervisor 45 has the selection control processor 46 turn on e.g. the CLP bit in the header part of the cells exceeding the first judging threshold, so that discarding of those cells is prioritized when the buffer of a multiplexer 49, or the buffer of a device connected in a later stage, lacks enough capacity. Also, the supervisor 45 has the selection control processor 46 turn on e.g. the RES bit in the header part of the cells exceeding the second judging threshold, so that those cells are supplied to the multiplexer 49 as empty cells, thereby causing those cells to be discarded anyway regardless of the available capacity in the buffer of the multiplexer 49. This is because the multiplexer 49 does not send empty cells to a concentrator switch 50.

Figure 7:
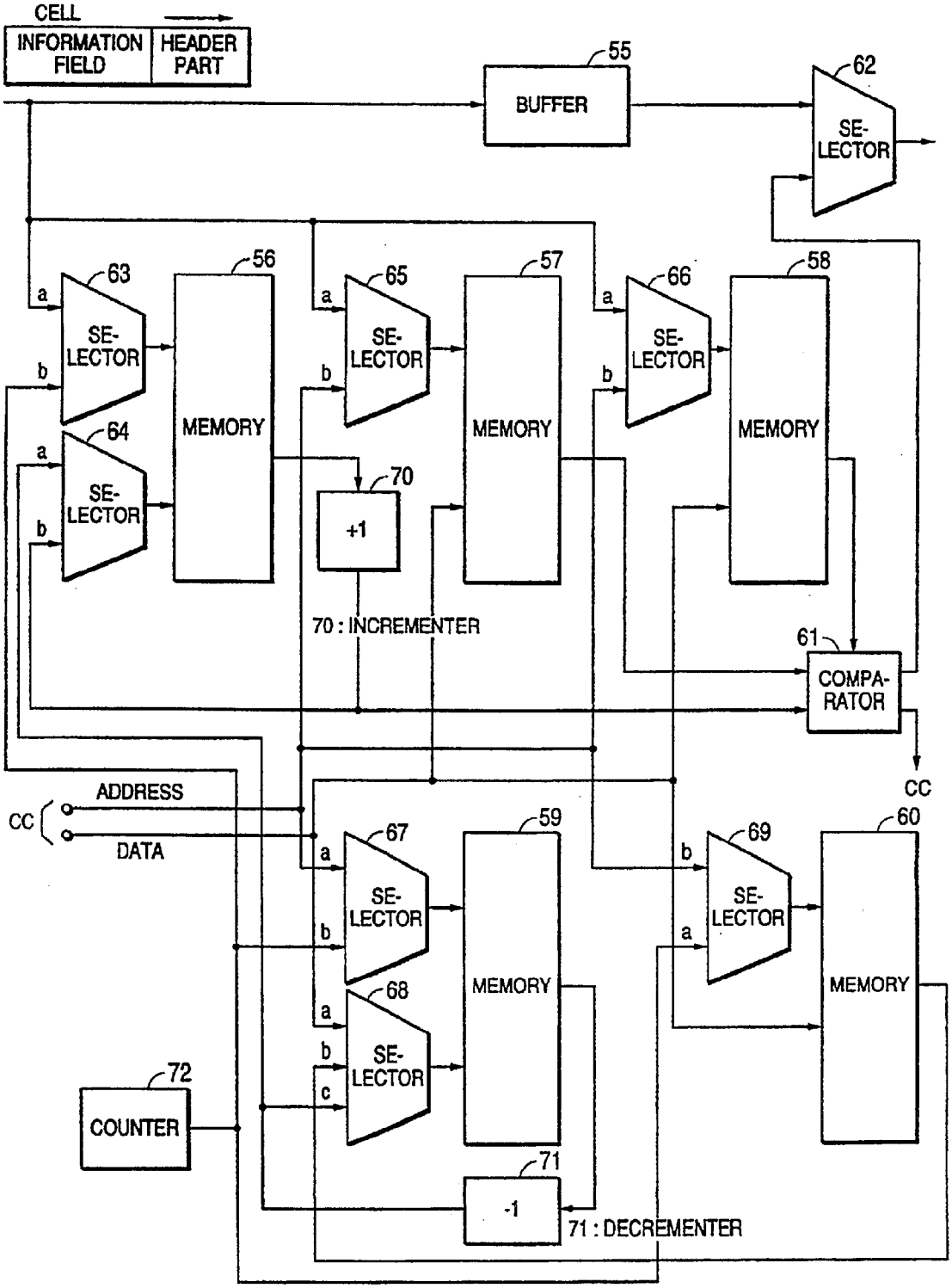
FIG. 7 is a block diagram of the supervisor and the selection control processor pertinent to the second embodiment of this invention.

FIG. 7 is a block diagram of the supervisor 45 and the selection, control processor 46 pertinent to the second embodiment of this invention.

A buffer 55 delays cells in correspondence with the delays caused by respective supervisions.

A memory 56 counts the number of cells passing through in a predetermined duration unit.

Memories 57 and 58 respectively store first and second judging thresholds.

A memory 59 measures an elapse of the predetermined duration unit.

A memory 60 stores duration unit data.

When the supervisor 45 commences its operations, a processor CC instructs selectors 65, 66 and 69 to select their "b" side inputs and to output them to respective address terminals of memories 57, 58 and 60, which receive data from the processor CC as respective data inputs. The processor CC supplies to "b" side inputs of selectors 65, 66 and 69 an address by which memories 57, 58 and 60 are accessed. The processor CC accesses memories 57, 58 and 60 to have them respectively store the first judging threshold, the second judging threshold and the duration unit data.

When the supervisor 45 commences its operations, the processor CC also instructs selectors 67 and 68 to select their "a" side inputs and to output, so that memory 59 receives an address and data from the processor CC. Memory 59 stores as its initial data duration unit data similar to those stored in memory 60. The processor stores data to be stored in memories 57, 58, 59 and 60 at respective addresses corresponding to VPIs/VCIs.

When the supervisor 45 commences its operations, memory 60 is reset and its stored data are initialized to zero (0).

That is, the processor CC supplies the first and second judging thresholds set correspondingly to the subscriber declared band, the duration unit data indicating the supervision cycle and the addresses corresponding to the subscriber assigned VPIs/VCIs. Memory 57 stores the first judging threshold. Memory 58 stores the second judging threshold. Memory 60 stores the duration unit data. Although all the duration unit data can be set the same, they can be set in correspondence with the subscriber characteristics. This is because pass-through cells sent from a subscriber in a burst need to be counted over a comparatively long period of time, whereas those sent from another in a more or less constant speed can be counted over a relatively short period of time.

Meanwhile, when the supervisor 45 commences its operation, selectors 63, 65 and 66 select their "a" side inputs, so that the memories 56, 57 and 58 are accessed by using the VPIs/VCIs in the header part of cells as addresses. Selector 64 has memory 56 count the number of cells passing through by having an incrementer 70 increment the value by one (1) in an address region of memory 56 corresponding to the VPIs/VCIs.

Selector 68 has memory 59 store duration unit data stored in memory 60, each time the value stored in memory 59 becomes zero (0). A decrementer 71 decrements the value stored in memory 59 by one (1). When the value stored in memory 59 reaches zero (0), memory 56 clears its address regions corresponding to the VPIs/VCIs set in correspondence with the duration unit data. That is, memory 56 counts cells passing through in predetermined units in the address fields corresponding to their VPIs/VCIs. Then, memory 59 again stores duration unit data stored in memory 60, again.

A counter 72 generates respective addresses for managing duration units e.g. up to the maximum value of the VPIs/VCIs. Although this is not shown in the drawings, the counter 72 receives a clock signal, accesses memory 59, each time its own value is incremented by one (1), by using the incremented value as the address, and decrements the value stored in memory 59 by one (1). At this time, selector 67 selects its "b" side input and selector 68 selects its "c" side input.

A count cycle [from zero (0) to next zero (0)] in the counter 72 becomes the basis of the duration unit data stored in the memory 60. The values obtained by multiplying the count cycle by the duration unit data become duration units corresponding to the VPIs/VCIs.

When the value stored in memory 59 accessed by value of the counter 72 becomes zero (0), selector 68 switches its selection from "c" side input to "b" side input, thereby loading the duration unit data in memory 60, again.

The counting by the counter 72 enables the addresses corresponding to all the VPIs/VCIs to be specified, thereby realizing duration units to be managed.

Ordinarily, selectors 63, 65, and 66 select their "a" side inputs, access the corresponding address each time a cell passes through, and perform the following operations.

The count value of the cells passing through stored in memory 56 is supplied to the comparator 61 through the incrementer 70. The comparator 61 receives the first judging threshold stored in memory 57 and the second judging threshold stored in memory 58. When the number of cells passing through is less than the first and second thresholds, the comparator 61 does not control the selector 62 and cells passing through the buffer 55 also pass through selector 62 without any obstruction. Also, when the number of cells passing through is more than the first threshold but less than the second threshold, the excess cells over the first judging threshold are transmitted after selector 62 turns on the CLP bit in the header part of those cells. Finally, when the number of cells passing through is more than the second judging threshold, selector 62 converts the excess cells over the second judging threshold to empty cells, where all the bits are zero (0). The comparator 61 notifies the processor CC of the result of respective processings.

Because selector 62 supplies cells to the multiplexer for cell multiplexation, cells with the CLP bit on are discarded when the buffer lacks the capacity. Since cells from other subscribers are within their declared bands, even if a subscriber sends cells in excess of his declared band, ill-effects on other subscribers are minimized. When the numbers of cells from other subscribers are small, i.e. when the buffer has enough capacity, the multiplexer multiplexes even the cells with their CLP bit on.

Cells far exceeding the declared band are discarded, e.g. through an empty cell conversion, to avoid discarding of cells from other subscribers within their declared bands.

In the first and second embodiments of this invention, the supervisors 23, 33-1 through 33-m, and 45 output cells in which all the bits are zero (0) to multiplexers 24, 34 and 49, where these cells are actually discarded. However, this invention is not limited to such a configuration.

Figure 8:
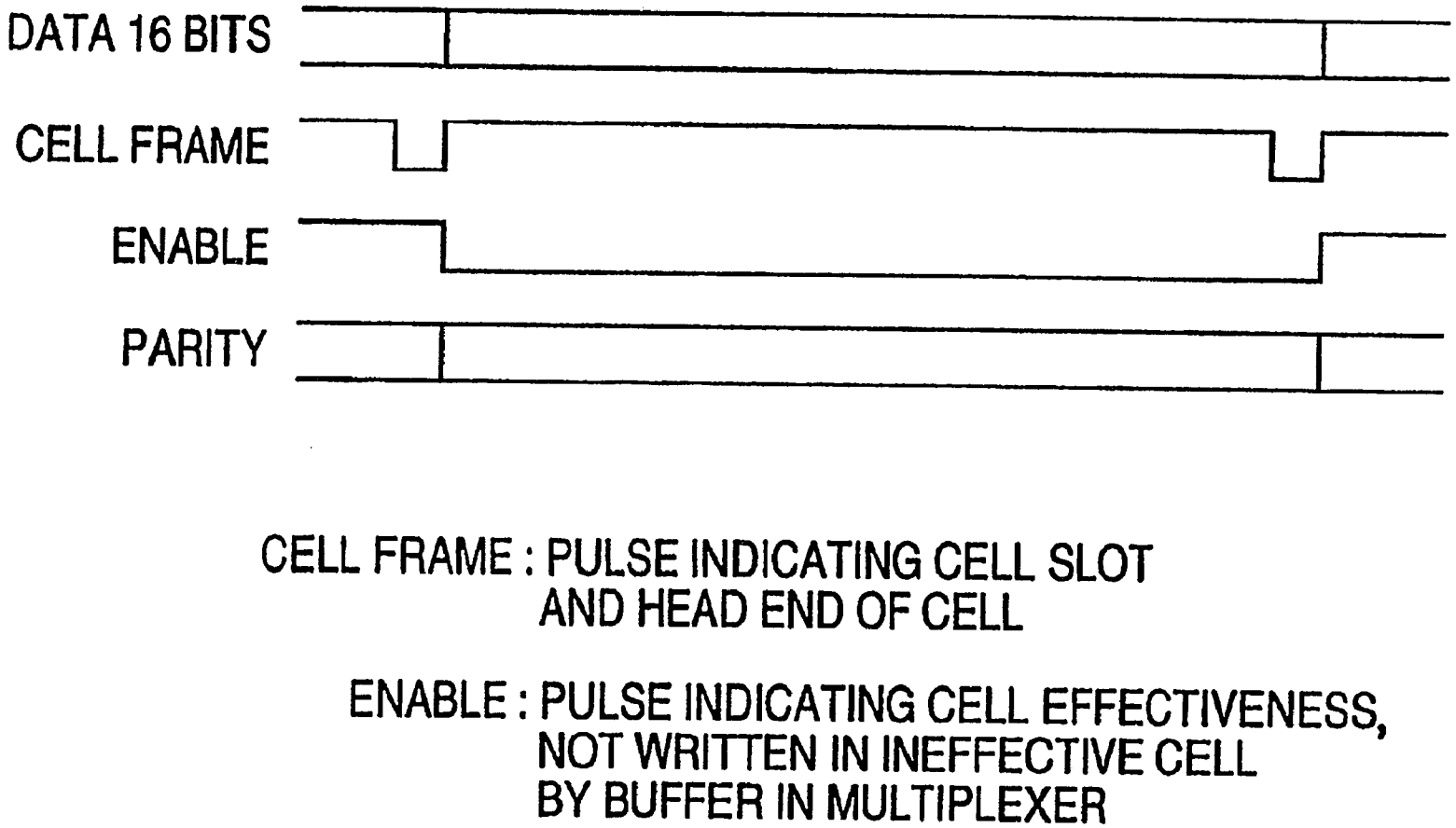
FIG. 8 illustrates the input interface of a multiplexer.

FIG. 8 illustrates the input interface of a multiplexer.

As shown in FIG. 8, the multiplexers 24, 34 and 49 can use an input interface such that a "Data Line" comprises sixteen (16) bits, a "Cell Frame" comprises one (1) bit, an "Enable" comprises one (1) bit and a "Parity" comprises one (1) bit. The "Data Line" is a signal line for transmitting the cell width. "Cell Frame" is a signal line specifying the head end of each cell by a pulse indicating a "Cell Slot". "Enable" is a signal line specifying the cells' effectiveness. "Parity" is a data error scanning line.

When the numbers of cells are more than the second threshold, the supervisors 23, 33-1 through 33-m and 45 turn off "Enable" without performing any data control. The multiplexers 23, 34 and 49 discard cells without multiplexing them when their "Enable" is off.

This invention is not limited to those embodiments, but instead can be applied in various derivative forms. For instance, it goes without saying that counting of the number of cells passing through by memory 56 can be substituted by counting by an ordinary counter.

Further, this invention can be applied also to any cell switching system, in addition to an ATM cell switching system.

As explained earlier, this invention causes an ATM switching system to have its cell counter 21 in its supervisor 23 to count the cells inputted from respective subscribers. When the judge 22 discovers that the number of cells inputted from a particular subscriber exceeds his declared band, the judge 22 attaches a sign to the excess cells to be sent to the multiplexer 24 e.g. by turning on their CLP bit. When its buffer has enough capacity, the multiplexer 24 ordinarily multiplexes the cells. However, when its buffer lacks it, the multiplexer 24 prioritizes the discarding of these cells. Thus, even if its buffer lacks enough capacity, the multiplexer 24 prioritizes the multiplexation of cells from other subscribers, as long as such cells are within their declared bands. Hence, this invention produces a distinct advantage of eliminating a possible ill-effect on others when a particular subscriber sends his cells beyond his declared band, while maintaining the best communication quality by avoiding unnecessary cell discarding.

Alternatively, this invention can be structured such that first and second judging thresholds are used for an even finer cell discarding control. That is, a sign is attached to excess cells over the first judging threshold e.g. by turning on the CLP bit, and excess cells over the second judging threshold are converted to empty cells and discarded. As a result, cells exceeding a declared band by a narrow margin can be multiplexed ordinarily depending on the availability of buffering capacity, while cells exceeding a declared band by a wide band are discarded to minimize the ill-effect on other subscribers.

Thus, this invention is effective in reduction of discarding cells within declared bands and in preventing a deterioration in communications quality by supervising cells flowing in an ATM cell switching system.

What is claimed is:

1. A supervision control method for an asynchronous transmission mode cell switching system comprising the steps of:

(*a*) *storing a plurality of bandwidth data which are pre-assigned to a plurality of sources of cells, and are stored in memory regions at memory addresses, each of the memory addresses being operatively accessed based on one of a plurality of identified virtual connections;*

([a]*b*) counting cells having *one of the plurality of identified virtual connections formed by* a particular virtual channel identifier and a particular virtual path identifier transmitted from a subscriber in a predetermined duration unit, by incrementing a count value stored in [a] *one of the* memory [region] *regions* having an address uniquely accessed with said particular virtual channel identifier and said particular virtual path identifier;

([b]*c*) attaching a sign to the cells when the count value incremented in said step ([a]*b*) exceeds a predetermined value; and ([c]*d*) discarding the cells to which said sign is attached when a buffer does not have enough capacity to multiplex the cells.

2. A supervision control method for an asynchronous transmission mode cell switching system comprising the steps of:

(a) counting cells having a particular virtual channel identifier and a particular virtual path identifier received from a subscriber in a predetermined unit by incrementing a count value stored in a memory region having an address uniquely accessed with said particular virtual channel identifier and said particular virtual path identifier;

(b) attaching a sign to the cells when the count value incremented in said step (a) exceeds a first predetermined value;

(c) discarding the excess cells over a second predetermined value when the count value incremented in said step (a) exceeds the second predetermined value; and (d) discarding the excess cells over the first predetermined value, to which the sign is attached in said step (b), when a buffer does not have enough capacity to multiplex the cells.

3. The supervision control method according to claim 2, wherein said step (b) attaches based on the first predetermined value as a number of peak cells in the predetermined duration unit; and wherein said step (a) comprises the substep of designating the first and second predetermined values based on a designation received from the subscriber.

4. A supervision control apparatus for an asynchronous transmission mode cell switching system comprising:

*a memory to store a plurality of bandwidth data which are pre-assigned to sources of cells, the bandwidth data being stored at addresses thereof, each address being operatively accessed based on one of a plurality of identified virtual connections;* a cell counter including a memory to store a count value at an address uniquely accessed with *one of the plurality of identified virtual connections formed by* a particular virtual channel identifier and a particular virtual path identifier, for counting cells having said particular virtual channel identifier and said particular virtual path identifier transmitted from a subscriber in a predetermined duration unit by incrementing the count value;

a judge circuit for attaching a sign to the cells when the count value incremented by said cell counter exceeds a predetermined value; and a multiplexer for discarding the cells to which the sign is attached when a buffer does not have enough capacity to multiplex the cells.

5. The supervision control apparatus according to claim 4, wherein said judge circuit comprises a selector to switch when said sign is attached to a cell.

6. A supervision control apparatus for a cell switching system comprising:

a cell counter including a memory to store a count value at an address uniquely accessed with a particular virtual channel identifier and a particular virtual path identifier, for counting cells having said particular virtual channel identifier and said particular virtual path identifier transmitted from a subscriber in a predetermined duration unit;

a judge circuit for attaching a sign to the cells when the count value incremented by said cell counter exceeds a first predetermined value;

a selector for discarding the excess cells over a second predetermined value when the count value incremented by said cell counter exceeds the second predetermined value; and a multiplexer for discarding the excess cells over the first predetermined value, to which said sign is attached by said judge circuit, when a buffer does not have enough capacity to multiplex the cells.

7. The supervision control apparatus according to claim 6, wherein said first predetermined value is a number of average cells in said predetermined duration unit and said second predetermined value is a number of peak cells in said predetermined duration unit; and wherein said system further comprises a receiver for receiving a designation from the subscriber to designate the first and second predetermined values.

8. The supervision control apparatus for an asynchronous transmission mode cell switching system according to claim 6, wherein said selector outputs "0" upon discarding the cells.

*9. A supervision control method in which cells, each including a header field with an identified virtual connection, are received from a plurality of sources, comprising:*

*storing a plurality of bandwidth data which are pre-assigned to the sources of the cells and are stored at memory addresses, each of the memory addresses being operatively accessed based on one of a plurality of identified virtual connections;*

*monitoring a transmission rate on the identified virtual connection of a received cell;*

*comparing the transmission rate with the bandwidth data stored at a memory address corresponding to the identified virtual connection of the received cell; and*

*marking the received cell to indicate a higher cell loss priority when the monitored transmission rate of the received cell exceeds a rate corresponding to the bandwidth data.*

*10. A supervision control method according to claim 9, wherein said monitoring comprises counting a number of the received cells having the same identified virtual connection in a predetermined duration unit.*

*11. A supervision control method, according to claim 9, further comprising discarding the received cell which has been marked to indicate a higher cell loss priority when a buffer has less capacity than an operative capacity for buffering the received cell.*

*12. A supervision control apparatus in which cells, each including a header field with an identified virtual connection, are received from a plurality of sources, comprising:*

*a memory to store a plurality of bandwidth data which are pre-assigned to the sources of the cells, and are stored at addresses thereof, each of the addresses being operatively accessed based on one of a plurality of identified virtual connections;*

*a cell counter to monitor a transmission rate on the identified virtual connection of a received cell;*

*a comparator to compare the monitored transmission rate of said cell counter with the bandwidth data stored at an address of said memory corresponding to the identified virtual connection of the received cell; and*

*a judge circuit to mark the received cell to indicate a higher cell loss priority when the monitored transmission rate exceeds a rate corresponding to the bandwidth data.*

*13. A supervision control apparatus according to claim 12, wherein said cell counter counts a number of the received cells having the same identified virtual connection in a predetermined duration unit.*

*14. A supervision control apparatus according to claim 12, further comprising a discard circuit to discard the received cell which has been marked to indicate a higher cell loss priority when a buffer has less capacity than an operative capacity to store the received cell.*

*15. A supervision control apparatus in which cells, each including a header field with an identified virtual connection, are received from a plurality of sources, comprising:*

*memory means for storing a plurality of bandwidth data which are pre-assigned to the sources of the cells, and are stored at addresses thereof, each of the addresses being operatively accessed based on one of a plurality of identified virtual connections;*

*monitor means for monitoring a transmission rate on the identified virtual connection of a received cell;*

*comparing means for comparing the monitored transmission rate of said monitor means with the bandwidth data stored at an address of said memory means corresponding to the identified virtual connection of the received cell; and*

*mark means for marking the received cell to indicate a higher cell loss priority when the monitored transmission rate exceeds a rate corresponding to the bandwidth data.*

*16. A supervision control apparatus according to claim 15, wherein said monitor means counts a number of the*

*received cells having the same identified virtual connection in a predetermined duration unit.*

*17. A supervision control apparatus according to claim 15, further comprising discard means for discarding the received cell which has been marked to indicate a higher cell loss priority when a buffer has less capacity than an operative capacity for buffering the received cell.*

*18. A supervision control apparatus, comprising:*

*a buffer memory to receive and store a cell including a header field with an identified virtual connection;*

*a memory to store a plurality of bandwidth data which are pre-assigned to sources of cells, and are stored at addresses thereof, each of the addresses being operatively accessed based on one of a plurality of identified virtual connections;*

*a cell counter to monitor a transmission rate on the identified virtual connection of a received cell;*

*a comparator to compare the monitored transmission rate of said cell counter with the bandwidth data stored at an address of said memory corresponding to the identified virtual connection of the received cell; and*

*a judge circuit to mark the received cell to indicate a higher cell loss priority when the monitored transmission rate exceeds a rate corresponding to the bandwidth data.*

*19. A supervision control apparatus according to claim 18, wherein said cell counter counts a number of the received cells having the same identified virtual connection in a predetermined duration unit.*

*20. A supervision control apparatus according to claim 18, further comprising a discard circuit to discard the received cell which has been marked to indicate a higher cell loss priority when said buffer memory has less capacity than an operative capacity to store the received cell.*

*21. A supervision control apparatus, comprising:*

*a receiver to receive a cell including a header field with an identified virtual connection;*

*a memory to store a plurality of bandwidth data which are pre-assigned to sources of cells, and are stored at addresses thereof, each of the addresses being operatively accessed based on one of a plurality of identified virtual connections;*

*a cell counter to monitor a transmission rate on the identified virtual connection of a received cell;*

*a comparator to compare the monitored transmission rate of said cell counter with the bandwidth data stored at an address of said memory corresponding to the identified virtual connection of the received cell; and*

*a judge circuit to mark the received cell to indicate a higher cell loss priority when the monitored transmission rate exceeds a rate corresponding to the bandwidth data.*

*22. A supervision control apparatus according to claim 21, wherein said cell counter counts a number of the received cells having the same identified virtual connection in a predetermined duration unit.*

*23. A supervision control apparatus according to claim 21, further comprising a discard circuit to discard the received cell which has been marked to indicate a higher cell loss priority when a buffer has less capacity than an operative capacity to store the received cell.*

*24. A supervision control apparatus, comprising:*

*a receiver to receive a cell including a header field with an identified virtual connection and a cell loss priority bit indicating a cell loss priority;*

*a memory to store a plurality of bandwidth data which are pre-assigned to sources of cells, and are stored at addresses thereof, each of the addresses being operatively accessed based on one of a plurality of identified virtual connections;*

*a cell counter to monitor a transmission rate on the identified virtual connection of a received cell;*

*a comparator to compare the monitored transmission rate of said cell counter with the bandwidth data stored at an address of said memory corresponding to the identified virtual connection of the received cell; and*

*a judge circuit to mark the cell loss priority bit to indicate a higher cell loss priority when the monitored transmission rate exceeds a rate corresponding to the bandwidth data.*

*25. A supervision control apparatus according to claim 24, wherein said cell counter counts a number of the received cells having the same identified virtual connection in a predetermined duration unit.*

*26. A supervision control apparatus according to claim 24, further comprising a discard circuit to discard the received cell which has been marked to indicate a higher cell loss priority when a buffer has less capacity than an operative capacity to store the received cell.*

*27. A supervision control apparatus in which a cell including a header field with an identified virtual connection and a cell loss priority bit indicating a cell loss priority, is received from a source, comprising:*

*a memory to store a plurality of bandwidth data which are pre-assigned to sources of cells, and are stored at addresses thereof, each of the addresses being operatively accessed based on one of a plurality of identified virtual connections;*

*a cell counter to monitor a transmission rate on the identified virtual connection of the received cell;*

*a comparator to compare the monitored transmission rate of said cell counter with the bandwidth data stored at an address of said memory corresponding to the identified virtual connection of the received cell; and*

*a judge circuit to mark the cell loss priority bit to indicate a higher cell loss priority when the monitored transmission rate exceeds a rate corresponding to the bandwidth data.*

*28. A supervision control apparatus according to claim 27, wherein said cell counter counts a number of the received cells having the same identified virtual connection in a predetermined duration unit.*

*29. A supervision control apparatus according to claim 27, further comprising a discard circuit to discard the received cell which has been marked to indicate a higher cell loss priority when a buffer has less capacity than an operative capacity to store the received cell.*

*30. A supervision control method, comprising:*

*receiving a cell including a header field with an identified virtual connection;*

*storing a plurality of bandwidth data which are pre-assigned to a plurality of sources of cells, and are stored at memory addresses, each of the memory addresses being operatively accessed based on one of a plurality of identified virtual connections;*

*monitoring a transmission rate on the identified virtual connection of a received cell;*

*comparing the transmission rate with the bandwidth data stored at the memory address corresponding to the identified virtual connection of the received cell; and*

*marking the received cell to indicate a higher cell loss priority when the monitored transmission rate of the received cell exceeds a rate corresponding to the bandwidth data.*

*31. A supervision control method according to claim 30, wherein said monitoring step comprises counting a number of the received cells having the same identified virtual connection in a predetermined duration unit.*

*32. A supervision control method according to claim 30, further comprising discarding the received cell which has been marked to indicate a higher cell loss priority when a buffer has less capacity than an operative capacity for buffering the received cell.*

*33. A supervision control method, comprising:*

*receiving a cell including a header field with an identified virtual connection and a bit indicating a cell loss priority;*

*storing a plurality of bandwidth data which are pre-assigned to a plurality of sources of cells, and are stored at memory addresses, each of the memory addresses being operatively accessed based on one of a plurality of identified virtual connections;*

*monitoring a transmission rate on the identified virtual connection of a received cell;*

*comparing the transmission rate with the bandwidth data stored at the memory address corresponding to the identified virtual connection of the received cell; and*

*marking the bit to indicate a higher cell loss priority when the monitored transmission rate of the received cell exceeds a rate corresponding to the bandwidth data.*

*34. A supervision control method according to claim 33, wherein said monitoring step comprises counting a number of the received cells having the same identified virtual connection in a predetermined duration unit.*

*35. A supervision control method according to claim 33, further comprising discarding the received cell which has been marked to indicate a higher cell loss priority when a buffer has less capacity than an operative capacity for buffering the received cell.*

*36. A supervision control method in which cells, each including a header field with an identified virtual connection and a bit indicating a cell loss priority, are received, comprising:*

*storing a plurality of bandwidth data which are pre-assigned to sources of the cells, and are stored at memory addresses, each of the memory addresses being operatively accessed based on one of a plurality of identified virtual connections;*

*monitoring a transmission rate on the identified virtual connection of a received cell;*

*comparing the transmission rate with the bandwidth data stored at the memory address corresponding to the identified virtual connection of the received cell; and*

*marking the bit to indicate a higher cell loss priority when the monitored transmission rate of the received cell exceeds a rate corresponding to the bandwidth data.*

*37. A supervision control method according to claim 36, wherein said monitoring comprises counting a number of the received cells having the same identified virtual connection in a predetermined duration unit.*

*38. A supervision control method according to claim 36, further comprising discarding the received cell which has been marked to indicate a higher cell loss priority when a buffer has less capacity than an operative capacity for buffering the received cell.*

*39. A switching system which receives a cell including a header field with an identified virtual connection, comprising:*

*a supervisor, including:*

*a memory to store a plurality of bandwidth data which are pre-assigned to sources of cells, and are stored at memory addresses, each of the memory addresses being operatively accessed based on one of a plurality of identified virtual connections;*

*a cell counter to monitor a transmission rate on the identified virtual connection specified by a received cell;*

*a comparator to compare the monitored transmission rate of said cell counter with the bandwidth data stored at a memory address corresponding to the identified virtual connection of the received cell; and*

*a judge circuit to mark the received cell to indicate a higher cell loss priority when the monitored transmission rate exceeds a rate corresponding to the bandwidth data; and*

*a switch to direct the cell from said supervisor to the identified virtual connection.*

*40. A switching system according to claim 39, wherein said cell counter counts a number of the received cells having the same identified virtual connection in a predetermined duration unit.*

*41. A switching system according to claim 39, further comprising a discard circuit to discard the received cell which has been marked to indicate a higher cell loss priority when a buffer has less capacity than an operative capacity to store the received cell.*

*42. A switching system which receives a cell including a header field with an identified virtual connection and a bit indicating a cell loss priority, comprising:*

*a supervisor, including:*

*a memory to store a plurality of bandwidth data which are pre-assigned to sources of cells, and are stored at memory addresses, each of the memory addresses being operatively accessed based on one of a plurality of identified virtual connections;*

*a cell counter to monitor a transmission rate on the identified virtual connection of a received cell;*

*a comparator to compare the monitored transmission rate of said cell counter with the bandwidth data stored at a memory address corresponding to the identified virtual connection of the received cell; and*

*a judge circuit to mark the bit to indicate a higher cell loss priority when the monitored transmission rate exceeds a rate corresponding to the bandwidth data; and*

*a switch to direct the cell from said supervisor to the identified virtual connection.*

*43. A switching system according to claim 42, wherein said cell counter counts a number of the received cells having the same identified virtual connection in a predetermined duration unit.*

*44. A switching system according to claim 42, further comprising a discard circuit to discard the received cell which has been marked to indicate a higher cell loss priority when a buffer has less capacity than an operative capacity to store the received cell.*

*45. A switching system, comprising:*

*an interface to receive a cell including a header field with an identified virtual connection and a bit indicating a cell loss priority;*

*a supervisor, including:*

*a memory to store a plurality of bandwidth data which are pre-assigned to sources of cells, and are stored at memory addresses, each of the memory addresses*

*being operatively accessed based on one of a plurality of identified virtual connections;*

*a cell counter to monitor a transmission rate on the identified virtual connection of a received cell;*

*a comparator to compare the monitored transmission rate of said cell counter with the bandwidth data stored at a memory address corresponding to the identified virtual connection of the received cell; and*

*a judge circuit to mark the bit to indicate a higher cell loss priority when the monitored transmission rate exceeds a rate corresponding to the bandwidth data; and*

*a switch to direct the cell from said supervisor to an output of the identified virtual connection.*

*46. A switching system according to claim 45, wherein said cell counter counts a number of the received cells having the same identified virtual connection in a predetermined duration unit.*

*47. A switching system according to claim 45, further comprising a discard circuit to discard the received cell which has been marked to indicate a higher cell loss priority when a buffer has less capacity than an operative capacity to store the received cell.*

*48. A switching system, comprising:*

*an interface to receive a cell including a header field with an identified virtual connection;*

*a supervisor, including:*

*a memory to store a plurality of bandwidth data which are pre-assigned to sources of cells, and are stored at memory addresses, each of the memory addresses being operatively accessed based on one of a plurality of identified virtual connections;*

*a cell counter to monitor a transmission rate on the identified virtual connection of a received cell;*

*a comparator to compare the monitored transmission rate of said cell counter with the bandwidth data stored at a memory address corresponding to the identified virtual connection of the received cell; and*

*a judge circuit to mark the received cell to indicate a higher cell loss priority when the monitored transmission rate exceeds a rate corresponding to the bandwidth data; and*

*a switch to direct the cell from said supervisor to an output of the identified virtual connection.*

*49. A switching system according to claim 48, wherein said cell counter counts a number of the received cells having the same identified virtual connection in a predetermined duration unit.*

*50. A switching system according to claim 48, further comprising a discard circuit to discard the received cell which has been marked to indicate a higher cell loss priority when a buffer has less capacity than an operative capacity to store the received cell.*

*51. A supervision control method in which a cell having a header field with an identified virtual connection, is received from a source, comprising:*

*storing a plurality of bandwidth data which are pre-assigned to sources of cells, and are stored at memory addresses, each of the memory addresses being operatively accessed based on one of a plurality of identified virtual connections; and*

*marking the received cell to indicate a higher cell loss priority when a transmission rate of the received cell exceeds a rate corresponding to the stored bandwidth data for the received cell.*

*52. A supervision control method according to claim 51, wherein said marking comprises counting the number of the received cells having the same identified virtual connection in a predetermined duration unit.*

*53. A supervision control method according to claim 51, further comprising discarding the received cell which has been marked to indicate a higher cell loss priority when a buffer has less capacity than an operative capacity for buffering the received cell.*

*54. A supervision control method according to claim 51, wherein said marking comprises:*

*monitoring a transmission rate on the identified virtual connection specified by a received cell; and*

*comparing the transmission rate with the bandwidth data stored at the memory address corresponding to the specified identified virtual connection.*

*55. A supervision control apparatus in which a cell having a header field with an identified virtual connection, is received from a source, comprising a supervisor including a memory to store a plurality of bandwidth data which are pre-assigned to sources of cells, and are stored at addresses thereof, each of the addresses being operatively accessed based on one of a plurality of identified virtual connections, said supervisor marking the received cell to indicate a higher cell loss priority when a transmission rate of the received cell exceeds a rate corresponding to the bandwidth data stored at an address of the memory corresponding to the identified virtual connection of the received cell.*

*56. A supervision control apparatus according to claim 55, wherein said supervisor includes a cell counter to count a number of the received cells having the same identified virtual connection in a predetermined duration unit.*

*57. A supervision control apparatus according to claim 55, further comprising a discard circuit to discard the received cell which has been marked to indicate a higher cell loss priority when a buffer has less capacity than an operative capacity to store the received cell.*

*58. A supervision control apparatus according to claim 55, wherein said supervisor further includes:*

*a cell counter to monitor a transmission rate on the identified virtual connection specified by a received cell;*

*a comparator, coupled to said memory and said cell counter, to compare the monitored transmission rate of said cell counter with the bandwidth data stored in said memory at the address corresponding to the identified virtual connection in the header field of the received cell; and*

*a judge circuit, coupled to said comparator, to mark the received cell to indicate a higher cell loss priority when the monitored transmission rate exceeds a rate corresponding to the bandwidth data.*

*59. A switching system which receives a cell including a header field with an identified virtual connection, comprising:*

*a supervisor including a memory to store a plurality of bandwidth data which are pre-assigned to sources of cells, and are stored at addresses thereof, each of the addresses being operatively accessed based on one of a plurality of identified virtual connections, said supervisor marking the received cell to indicate a higher cell loss priority when a transmission rate of the received cell exceeds a rate corresponding to the bandwidth data stored at the address of the memory corresponding to the identified virtual connection of the received cell; and*

*a switch to direct the cell from said supervisor to the identified virtual connection.*

*60. A switching system according to claim 59, wherein said supervisor includes a cell counter to count a number of received cells having the same identified virtual connection in a predetermined duration unit.*

*61. A switching system according to claim 59, further comprising a discard circuit to discard the received cell which has been marked to indicate a higher cell loss priority when a buffer has less capacity than an operative capacity to store the received cell.*

*62. A switching system which receives a cell including a header field with an identified virtual connection and a bit indicating a cell loss priority, comprising:*

*a supervisor including a memory to store a plurality of bandwidth data which are pre-assigned to sources of cells, and are stored at addresses thereof, each of the addresses being operatively accessed based on one of a plurality of identified virtual connections, said supervisor marking the received cell to indicate a higher cell loss priority when a transmission rate of the received cell exceeds a rate corresponding to the bandwidth data stored at the address of the memory corresponding to the identified virtual connection of the received cell; and*

*a switch to direct the cell from said supervisor to the identified virtual connection.*

*63. A switching system according to claim 62, wherein said supervisor includes a cell counter to count a number of the received cells having the same identified virtual connection in a predetermined duration unit.*

*64. A switching system according to claim 62, further comprising a discard circuit to discard the received cell which has been marked to indicate a higher cell loss priority when a buffer has less capacity than an operative capacity to store the received cell.*

*65. A switching system located along an identified virtual connection, comprising:*

*an interface to receive a cell including a header field with an identified virtual connection and a bit indicating a cell loss priority;*

*a supervisor including a memory to store a plurality of bandwidth data which are pre-assigned to sources of cells, and are stored at addresses thereof, each of the addresses being operatively accessed based on one of a plurality of identified virtual connections, said supervisor marking the bit to indicate a higher cell loss priority when the monitored transmission rate corresponding to the bandwidth data stored at an address of the memory corresponding to the identified virtual connection in the header field of the received cell; and*

*a switch, to direct the cell from said supervisor to an output of the identified virtual connection.*

*66. A switching system according to claim 65, wherein said supervisor includes a cell counter to count a number of the received cells having the same identified virtual connection in a predetermined duration unit.*

*67. A switching system according to claim 65, further comprising a discard circuit to discard the received cell which has been marked to indicate a higher cell loss priority when a buffer has less capacity than an operative capacity to store the received cell.*

*68. A switching system, comprising:*

*an interface to receive a cell including a header field with an identified virtual connection;*

*a supervisor including a memory to store a plurality of bandwidth data which are pre-assigned to sources of cells, and are stored at addresses thereof, each of the addresses being operatively accessed based on one of a plurality of identified virtual connections, said supervisor marking the received cell to indicate a higher cell loss priority when a transmission rate of the received cell exceeds a rate corresponding to the bandwidth data stored at an address of the memory corresponding to the identified virtual connection of the received cell; and*

*a switch to direct the cell from said supervisor to an output of the identified virtual connection.*

*69. A switching system according to claim 68, wherein said supervisor includes a cell counter to count a number of the received cells having the same identified virtual connection in a predetermined duration unit.*

*70. A switching system according to claim 68, further comprising a discard circuit to discard the received cell which has been marked to indicate a higher cell loss priority when a buffer has less capacity than an operative capacity to store the received cell.*

*71. A supervision control method, according to claim 1, wherein each of the cells is of fixed length.*

*72. A supervision control apparatus according to claim 4, wherein each of the cells is of fixed length.*

*73. A supervision control method, according to claim 9, wherein each of the cells is of fixed length.*

*74. A supervision control apparatus, according to claim 12, wherein each of the cells is of fixed length.*

*75. A supervision control apparatus, according to claim 15, wherein each of the cells is of fixed length.*

*76. A supervision control apparatus, according to claim 18, wherein each of the cells is of fixed length.*

*77. A supervision control apparatus, according to claim 21, wherein each of the cells is of fixed length.*

*78. A supervision control apparatus, according to claim 24, wherein each of the cells is of fixed length.*

*79. A supervision control apparatus, according to claim 27, wherein each of the cells is of fixed length.*

*80. A supervision control method, according to claim 30, wherein each of the cells is of fixed length.*

*81. A supervision control method, according to claim 33, wherein each of the cells is of fixed length.*

*82. A supervision control method, according to claim 36, wherein each of the cells is of fixed length.*

*83. A switching system, according to claim 39, wherein each of the cells is of fixed length.*

*84. A switching system, according to claim 42, wherein each of the cells is of fixed length.*

*85. A switching system, according to claim 45, wherein each of the cells is of fixed length.*

*86. A switching system, according to claim 48, wherein each of the cells is of fixed length.*

*87. A supervision control method, according to claim 51, wherein each of the cells is of fixed length.*

*88. A supervision control apparatus, according to claim 55, wherein each of the cells is of fixed length.*

*89. A switching system, according to claim 59, wherein each of the cells is of fixed length.*

*90. A switching system, according to claim 62, wherein each of the cells is of fixed length.*

*91. A switching system, according to claim 65, wherein each of the cells is of fixed length.*

*92. A switching system, according to claim 68, wherein each of the cells is of fixed length.*

*93. A supervision control method according to claim 9, wherein said storing comprises storing bandwidth data which is declared from the source of the received cell prior to transmitting the received cell from the source.*

*94. A supervision control apparatus according to claim 12, wherein said memory stores bandwidth data which is declared from the source of the received cell prior to transmitting the received cell from the source.*

*95. A supervision control apparatus according to claim 15, wherein said memory means stores bandwidth data which is declared from the source of the received cell prior to transmitting the received cell from the source.*

*96. A supervision control method according to claim 51, wherein said storing comprises storing bandwidth data which is declared from the source of the received cell prior to transmitting the received cell from the source.*

*97. A supervision control method, according to claim 55, wherein said memory stores bandwidth data which is declared from the source of the received cell prior to transmitting the received cell from the source.*

*98. A switching system, according to claim 59, wherein said memory stores bandwidth data which is declared from the source of the received cell prior to transmitting the received cell from the source.*

* * * * *